(No Model.)

J. B. TUPPER.
SAW SET.

No. 313,557. Patented Mar. 10, 1885.

Witnesses,
Geo. H. Strong.
J. F. Towne.

Inventor,
John B. Tupper
By Dewey & Co.
Attorneys

UNITED STATES PATENT OFFICE.

JOHN B. TUPPER, OF PETALUMA, CALIFORNIA.

SAW-SET.

SPECIFICATION forming part of Letters Patent No. 313,557, dated March 10, 1885.

Application filed May 12, 1884. (No model.)

*To all whom it may concern:*

Be it known that I, JOHN B. TUPPER, of Petaluma, county of Sonoma, and State of California, have invented an Improvement in Saw-Sets; and I hereby declare the following to be a full, clear, and exact description thereof.

My invention relates to the class of saw-sets and to certain new and useful improvements therein.

These improvements consist in an adjustable and reversible die or anvil, in a peculiarly-constructed and moving hammer or pressure-lever, and in an adjustable blade-resisting stop or screw in the cap of the handle-head, all of which I shall hereinafter fully explain.

The object of my invention is to provide a simple and effective saw-set adapted for various sizes of saws and teeth and capable of setting the teeth alike.

Figure 1:
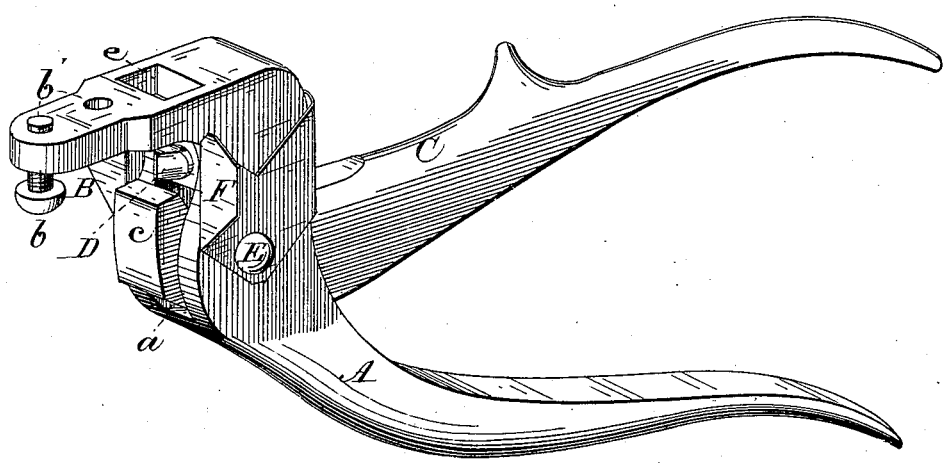
Figure 2:
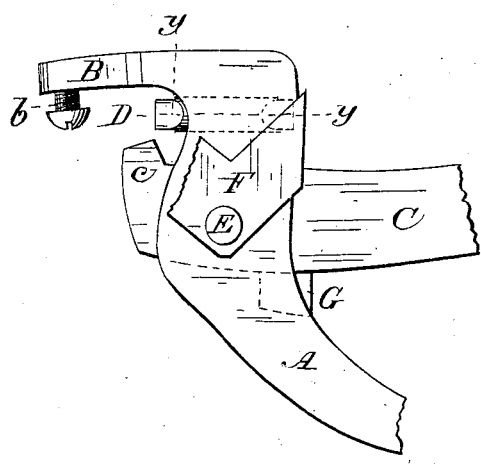
Figure 3:
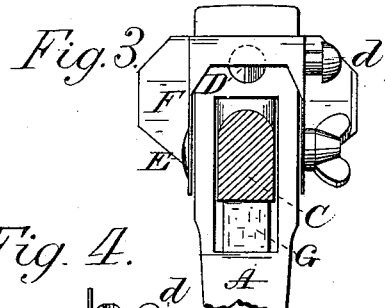
Figure 4:
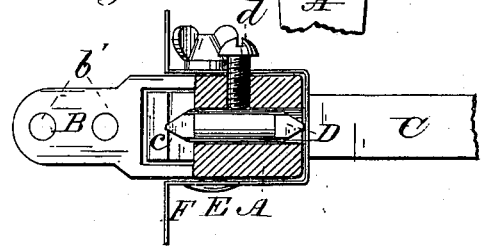

Referring to the accompanying drawings, Figure 1 is a perspective view of my saw-set. Fig. 2 is a side elevation. Fig. 3 is a rear elevation and part section. Fig. 4 is a horizontal section taken on the line *y y*, Fig. 2.

A is a handle having a slotted head, *a*, and a cap, B, in which is the blade-resisting stop or screw *b*.

C is a handle, the head *c* of which forms the hammer or pressure-lever, which sets the tooth against the die or anvil D. This anvil consists of a short bar having laterally-beveled ends or points, both ends being beveled and formed alike, whereby it is adapted to be reversed. The anvil fits through a socket in the head *a*, and is set in any position by means of a screw, *d*, passing through the side of the head and impinging upon said anvil, Fig. 4. The working end of the anvil projects from the face of the head directly under an aperture, *e*, made through the cap B, whereby the work can be seen. For small teeth the anvil is drawn back the required distance, and for large teeth it is projected to a suitable distance. The hammer *c* is pivoted by a bolt, E, within the slotted head *a*, and it projects beyond said anvil, whereby by reason of its pivot its motion toward the anvil is backward on the arc of a circle of which its pivot is the center. The top of the hammer is beveled downwardly from its inner edge to its outer edge. The degree or amount of this inclination is just sufficient to cause its top, when moved up under the saw-tooth, to press against it flat, Fig. 2. Its inward movement on the arc, as described, has the effect of drawing in the saw-tooth instead of having a tendency to force it out, and thus it gets a better hold on the tooth. By meeting it with a perfectly flat surface, it sets it evenly and perfectly and every tooth is set alike. When one end of the anvil is worn, it is reversed and the other end is used. F is a pivoted guide or stop which regulates the distance to which the tooth is to be inserted.

G is a rubber spring for separating the handles. In the cap B are made two holes, *b'*, for the screw *b*. When the screw is in the outer one, it is adapted for use on a wide blade. When in the inner hole, the saw-set can be used on a narrow blade. The saw being firmly secured in any suitable manner, usually horizontally, the tool is made to engage a tooth by fitting the hammer *c* under it, so that said tooth lies upon the hammer. At the same time the blade-resisting stop or screw *b* bears down upon the plate of the saw behind the tooth. The anvil D lies just above the tooth. Then the handles are forced together, whereby the hammer bears up under and presses the tooth between itself and the anvil, while by reason of the resisting-stop *b* the set or angle is put on the tooth.

The general operation of this saw-set is similar to all others of this class.

The invention lies in improvements in particular parts whereby certain advantages are gained. These improvements and their objects are fully set forth in the specification, and are distinguished in the claims.

Having thus described my invention, what I claim as new, and desire to secure by Letters Patent, is—

1. In a saw-set, the combination, with the horizontally-adjustable anvil D, having both its ends \/-shaped, of a set-screw, *d*, whereby said anvil may have a horizontal movement, substantially as herein set forth.

2. In a saw-set, the combination of handle A, having the slotted head *a*, the horizontally-adjustable and beveled anvil D therein and projecting from its face, and the handle C, having a beveled hammer-head, c, pivoted in the slotted head a under the anvil and projecting beyond said anvil, substantially as and for the purpose described.

3. In a saw-set, the handle A, having slotted head a, and the horizontally-adjustable and beveled anvil D, projecting from the face of the head, in combination with the handle C, having the hammer-head c, pivoted in the slotted head a under the anvil, said hammer-head projecting beyond the anvil and having a downwardly-beveled top from its inner to its outer edge, substantially as and for the purpose herein described.

In witness whereof I have hereunto set my hand.

JOHN B. TUPPER.

Witnesses:
FRANK W. SHATTUCK,
SUSIE TUPPER.